SITUATION DETERMINING DEVICE

Filed Dec. 22, 1955 9 Sheets-Sheet 1

INVENTOR.
ARTHUR H. DICKINSON
BY

Feb. 27, 1962 A. H. DICKINSON 3,023,399

SITUATION DETERMINING DEVICE

Filed Dec. 22, 1955 9 Sheets-Sheet 2

Feb. 27, 1962 A. H. DICKINSON 3,023,399

SITUATION DETERMINING DEVICE

Filed Dec. 22, 1955 9 Sheets-Sheet 3

SITUATION DETERMINING DEVICE

Filed Dec. 22, 1955 9 Sheets-Sheet 7

United States Patent Office 3,023,399
Patented Feb. 27, 1962

3,023,399
SITUATION DETERMINING DEVICE

Arthur H. Dickinson, Greenwich, Conn., assignor to International Business Machines Corporation, New York, N.Y., a corporation of New York

Filed Dec. 22, 1955, Ser. No. 554,703
5 Claims. (Cl. 340—149)

This invention relates to a situation determining device, and more particularly to such an electronic device which is capable of evaluating and manifesting the relationship between two or more conditions or items.

In the business and scientific world, the making of decisions often requires a preliminary determination of the relationship between two or more sets of facts or items. For example, in the area of selling, a sales manager may wish to know quickly the volume of sales in a number of territories on a competitive basis. Furthermore, it may be important to know this information not for one but for a number of periods. A quick determination of the true relationship between a plurality of items of conditions also has utility in the programming of business machines. For example, a calculating machine may be conditioned for a particular type of operation in accordance with the relationship of the items to which the calculator is subjected.

Prior art electromechanical and electrical comparing devices were capable of determining the relationship between items of information. Such an electrical item comparing device is located in U.S. Patent No. 2,484,081. However, the prior art devices are limited by their inability to evaluate a plurality of items of information, simply and flexibly, on a logical comprehensive basis, and to manifest the particular logic of the items of information.

Therefore, the principal object of this invention is to provide an information evaluating device which is capable of evaluating a plurality of items of information on a comprehensive logical basis and manifesting the particular logic of the items of information.

Another object of this invention is to provide an information evaluating device which is capable of manifesting the particular logic of a plurality of data items by a control pulse.

Still another object is to provide an electronic system wired in accordance with a pattern of relationships establishable by more than two quantities and responsive to quantity manifestations for determining a relationship between the quantities.

A further object is to provide a device for determining which one of a relatively large number of relationships exists.

Still another object is to provide a device for analyzing a plurality of amounts, any amount being related to more than one other amount in a plurality of ways.

Another object is to provide a device responsive to a plurality of amounts which amounts may be logically related in a number of ways exceeding the number of amounts and for determining which logical relationship is present.

A still further object is to provide a device to which amounts can be applied, said amounts being related in a number of ways exceeding the number of amounts, whereby the device determines the logical relationship that is present, said determination being applied to another device responsive to still other amounts, and a manifestation is produced of the compound relationship present.

Another object is to provide an improved evaluating device which operates on a differentially timed basis.

Another object is to provide an evaluating device for establishing the relative magnitude of amounts manifested on an algebraic basis.

A further object is to provide a matrix network wired in accordance with a pattern of relationships establishable by at least two quantities and controlling the matrix network by a comparing circuit.

In the evaluating system according to the invention, provision is made for the evaluation of three known items of information on an algebraic basis. Each of the three items comprises three orders, namely, an order for indicating the sign (+ or —), a tens order field and a units order field. Of course, any number of items having a plurality of orders may be evaluated, for purposes of determining an inter-relationship, by simply increasing the number of evaluating circuits.

The information which is to be evaluated is initially located upon some record material, such as a record card, by punching or by placing magnetic marks in predetermined columns of said material. In the case where the quantities are punched on record cards, the information is read by brushes, certain ones of which, corresponding to the card columns containing information to be checked, being connected to a series of comparing circuits. One such comparing circuit determines the relationship between the signs of two quantities, another circuit compares the relationship between the tens order digits of these two quantities, and a third such circuit determines the relationship between the units order digits of these two quantities.

Each of these three basic comparing circuits in a two-quantity evaluating system controls the operation of an associated matrix network in such a manner as to positively indicate the result of the comparison. The three circuits are interconnected in a manner to permit the sign circuit to control the operation of the tens order and units order circuits. That is to say, the tens order circuit cannot develop a relationship indicating pulse for operating the units order circuit until the sign circuit determines that the signs of the quantities under comparison are equal. Similarly, the units order circuit can only develop a relationship indicating pulse when the tens order circuit determines that the digits in the tens order card columns are identical. The sign circuit is also capable of acting on the tens order and units order circuits, when the signs are minus, in such a manner as to indicate the true relationship between two negative quantities. That is to say, the numerically smaller negative quantity will be registered as the greater quantity.

To evaluate the relationship between three quantities, for example, A, B and C, three two-quantity evaluating circuits are employed and interconnected by means of a matrix network. The sign and quantity relationship indicating pulses developed by each of the two-quantity evaluating circuits are combined in a matrix network in order to develop a final relationship indicating pulse. The final pulse so developed may serve to energize, for example, an appropriate storage circuit and its corresponding selector magnet for the purpose of selecting a receiving pocket into which the particular card whose quantities have been evaluated may be inserted.

For evaluating the relationship between two different groups of quantities, for example, A, B and C, on the one hand, and X and Y, on the other, it is necessary to connect certain output terminals of the output matrix network of one evaluating group and certain output terminals of the output matrix network of the other evaluating group to appropriate coincidence circuits. These connections may be made directly or through a conventional plugboard commonly associated with business machines. The final group relationship indicating pulse may then serve to operate a particular selector magnet in order to enter the card containing the two groups of information under evaluation into a particular one of a number of card receiving pockets.

Other objects of the invention will be pointed out in the following description and claims and illustrated in the accompanying drawings which disclose by way of example the principle of the invention and the best mode, which has been contemplated, of applying that principle:

SORTING MACHINE

Figure 2:
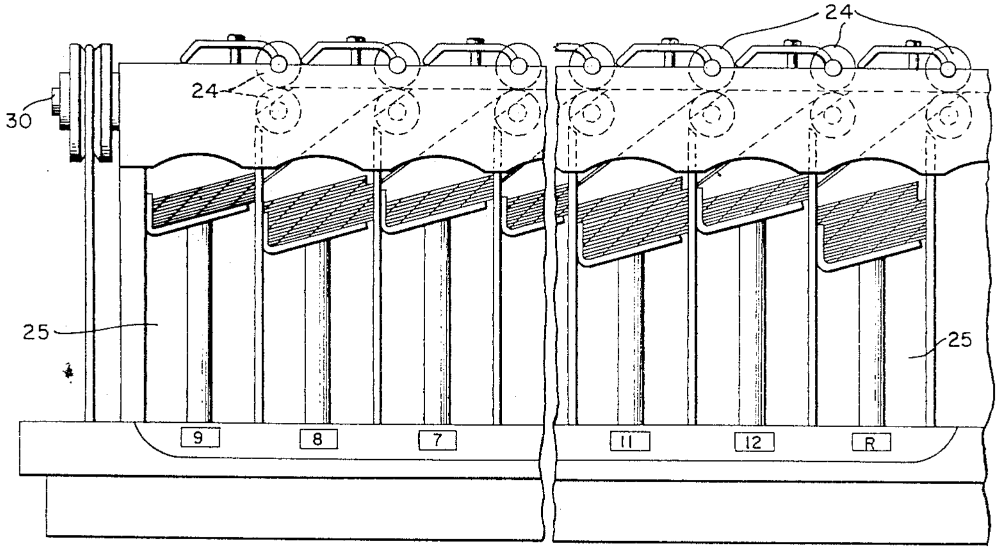
FIG. 2 shows, in elevation, receiving pockets of a sorting machine.

The comparing system of this invention is described according to its application in a record controlled business machine, commonly referred to as a sorter. Such a machine is fully described in U.S. Patent No. 2,359,630. Generally, such a machine is capable of moving a card into one or more reading stations where a determination is made of the quantitative manifestations thereon in order that a particular sorting magnet might be energized for the purpose of moving the card into a particular sorting pocket controlled by the determination.

More specifically, the sorting machine disclosed in the above-mentioned patent has a hopper 10 for holding a stack of cards which are to be analyzed and sorted. Immediately below the hopper are pickers 11 connected to rocker arms 12. Each arm 12 is linked by a member 13 to a crank arm 14 of a picker shaft 15. During a revolution of a picker shaft, pickers 11 are reciprocated and on their forward stroke feed the bottom card out of the hopper to feed roll 16. These feed rolls advance the card to an analyzer A comprising a row of sensing brushes 17, one for each card column, and a contact roll 18. Before the card leaves rolls 16, it is engaged by upper and lower feed rolls 19, the lower rolls being fixed to shaft 19A. Rolls 19 complete the feed of the card through analyzer A and advance it to feed rolls 20.

The feed rolls 20 move the card to an analyzer B comprising a row of sensing brushes 21 and a contact roll 22. Just before engaging brushes 21, the card operates card lever CL3 to close contacts $CL3^1$. When the leading end of the card passes analyzer B, it is engaged by feed rolls 23 which advance the card to the first of successive pairs of feed rolls 24. These latter feed rolls 24 feed the card to one of the sorting pockets 25.

As illustrated in FIG. 2, there are 13 such pockets known as the 9, 8, . . . 0, 11, 12 and reject pockets. The pocket to which the card is led depends on the time of energization of a sorting magnet SM during a cycle in which the card is passing beyond feed rolls 20. The armature 26 of the magnet SM supports the downwardly biased entrance ends of guide plates 27. Each pair of plates defines a passage for the card leading to a different sorting pocket. If the card moves below all the plates it goes to the reject pocket. Upon energization of magnet SM at a differential time of the cycle, it permits those plates unsupported by the card to drop and open a path for the card to the pocket 25, as shown in FIG. 2.

Certain of the brushes 17 are connected to input terminals of the electronic comparing circuits of the invention. For example, assuming that the two quantities to be compared are located in columns 10, 11, 12 and 18, 19, 20, the brushes 17 corresponding to these card columns will be connected to input terminals of the sign circuit (FIG. 3A), the tens order circuit (FIG. 3B) and the units order circuit (FIG. 3C) of the two-quantity evaluating system, in the manner and for the purpose described below.

SIGN CIRCUIT

Figures 3, 3A:
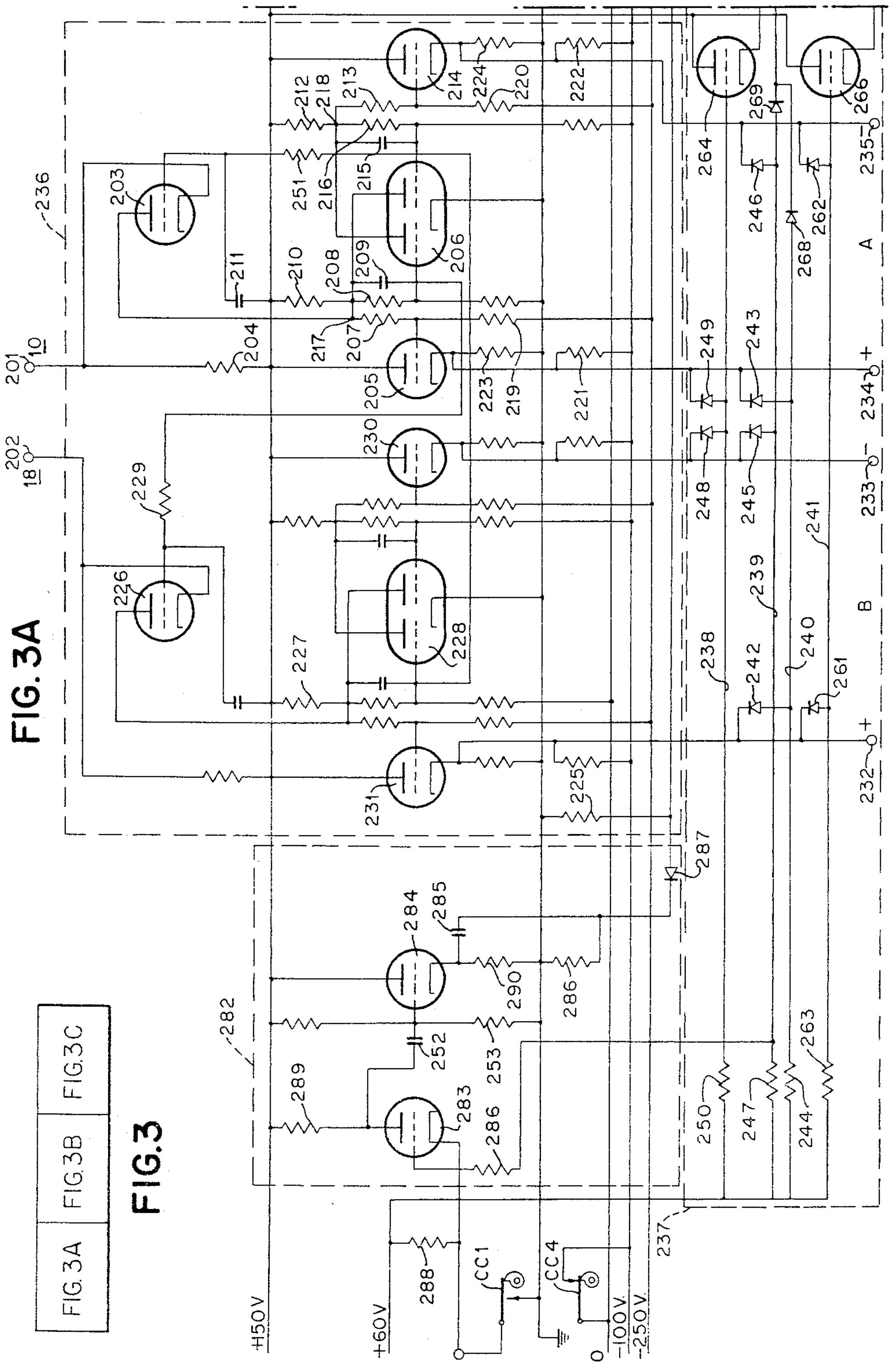
FIG. 3 is a block diagram of the two-quantity evaluating system illustrated in FIGS. 3A—3C.
FIG. 3A shows the sign circuit of a two-quantity evaluating system.

Referring to FIG. 3A, therein is illustrated a comparing circuit 236 which determines the character of the signs (that is + or —) of the particular two quantities under evaluation. Brush 17 corresponding to column 10 of the record card is connected, either directly or through a plugboard arrangement (not shown), to input terminal 201, and brush 17, corresponding to column 18 of the record card, is similarly connected to input terminal 202. When one of these two brushes determines the existence of a perforation in the record card, this brush is caused to be grounded through contact roll 18, and the corresponding input terminal 201 or 202 is also grounded. Thus either or both of these terminals may be grounded during a card reading operation.

Each input terminal 201 and 202 is in turn connected to the cathode of a control tube and the plate of a cathode follower. More specifically, input terminal 201 is directly connected to the cathode of control tube 203 and through resistor 204 to a positive voltage source and the plate of cathode follower 205. A grounded condition developed at input terminal 201 by the sensing of a perforation in column 10 by the appropriate sensing brush 17 causes the cathode of control tube 203 to go sufficiently negative to drive control tube 203 into a fully conductive condition. Inversely the absence of a negative condition at terminal 201 keeps the cathode of triode 203 at +150 volts. In the latter case, triode 203 will not conduct.

The plate of triode 203 is directly connected to the right plate of duo-triode 206, whose elements are connected as a bistable trigger circuit. The plate of triode 203 is also connected through resistor 207 to the grid of cathode follower 205 and through the R–C network consisting of resistor 208 and capacitor 209 to the left gird of duo-triode 206. The plate of control tube 203 and the plate of the right triode of the duo-triode 206 are connected through a resistor 210 to a +150 volt supply. Bias for the grid of triode 203 is developed through resistor 251, which is connected to the left grid of duo-triode 228.

The plate of the left triode of duo-triode 206 is connected to a +150 volt supply through resistor 212, and through resistor 213 to the grid of cathode follower 214. The R–C network consisting of capacitor 215 and resistor 216 connects the plate of the left side of duo-triode 206 to the grid of the right side.

The circuit is so designed that in a normal condition the right side of duo-triode 206 is non-conductive, therefore juncture 217 is at a higher potential than juncture 218. The trigger circuit is said to be Off at this time. When juncture 217 is at a lower potential than juncture 218, the trigger circuit is considered to be On. In the Off condition, the current flow in plate load resistor 212 reduces the positive potential which is made available through resistor 213 to the grid of cathode follower 214, and therefore tube 214 does not conduct. Resistor 220 connects the other side of the same grid to a —250 volt supply.

In the On condition the voltage drop across resistor 210 produces a lower potential at point 217, which potential is made available to the grid of cathode follower 205 through resistor 207. At this time, cathode follower 205 does not conduct and cathode follower 214 conducts. Resistor 219 connects one side of the tube 205 grid to a −250 volt supply.

Resistors 224 and 222 in the cathode circuit of tube 214 form a voltage divider connected between the ground line and the −100 volt line. This divider provides the necessary bias for the cathode of tube 214 and limits the negative swing of the cathode. The identical voltage divider for tube 205 is composed of resistors 223 and 221. Conduction in cathode follower 205 or 214 develops a voltage across the voltage divider of the conducting tube, and, thereby, causes a positive pulse to be developed at one of the output terminals 234 or 235, as the case may be.

The circuit associated with input terminal 202, which is connected to the brush associated with column 18 of a record card, in our example, is identical to the circuit already explained in the case of input terminal 201. As a hole is sensed at column 18 of a record card, the cathode of control tube 226 is made more negative and so current flows in the plate load resistor 227 which reduces the grid voltage available to the left triode of duo-triode 228. This effectively places trigger tube 228 in its On condition, that is the left triode section becomes non-conductive and the right triode section becomes conductive. The voltage drop across resistor 227 developed by current flow in the right triode section of tube 228 maintains the potential at the grid of cathode follower 231 below cut off and prevents this cathode follower from conducting. Output terminal 232, which is associated with cathode follower 231, is Down (negative) at this time and output terminal 233, which is associated with cathode follower 230 is Up (positive). In the absence of a perforation in column 18, this trigger circuit is Off, causing cathode follower 230 to be conductive and a positive pulse to be developed at output terminal 232 rather than 233.

Since it is arbitrarily assumed that a minus sign is identified by a perforation in a card and a plus sign is identified by the absence of a perforation, the situation at the four output terminals may be tabulated as follows:

| Sign | Column | Terminal up | Terminal down |
|---|---|---|---|
| − | 10 | 235 | 234 |
| + | 10 | 234 | 235 |
| − | 18 | 233 | 232 |
| + | 18 | 232 | 233 |

The first trigger circuit turned On will prevent the other trigger circuit from being turned On during the same machine cycle. For example, when trigger tube 206 is turned On, the grid of the left section of tube 206 is placed below cut off. This condition is reflected through resistor 229 at the grid of control tube 226, which is thereby prevented from conducting to turn On trigger tube 228 should input terminal 202 be grounded during the remainder of the machine cycle. In the same way, the turning On of trigger tube 228 maintains the grid of control tube 203 below cut off through resistor 251.

A group of conventional coincidence circuits forming a matrix network 237 is associated with the operation of cathode followers 205, 214, 230 and 231 of the sign comparing circuit 236, any one of the coincidence circuits being controlled by two of said cathode followers. Since two of the cathode followers are always operating, one of the coincidence circuits is also operating to produce a pulse on one of four lines 238, 239, 240 and 241. A detailed description of the diode type coincidence circuit may be found in the 1950 Proceedings of the I.R.E., pages 511–514.

For example, when the two triggers of the sign comparing circuit 236 are in their initial Off condition, cathode followers 205 and 231 are conductive, thereby causing the coincidence circuit, represented by diodes 242 and 243 and resistor 244 to be operated and line 240 to be Up. On the other hand, when holes are sensed simultaneously in columns 10 and 18, the two trigger circuits in comparing unit 236 are turned On and the coincidence circuit, consisting of diodes 245 and 246 and resistor 247, is operated to make line 239 to go Up. If the left trigger circuit of sign comparing circuit 236 is turned On by the presence of a perforation at column 18 (input terminal 202 is grounded) at the same time that no such perforation exists at column 10 (input terminal 201 is not grounded), cathode followers 230 and 205 are conductive, operating a coincidence circuit, consisting of diodes 248 and 249 and resistor 250, and causing line 238 to go Up. Finally, a perforation in column 10 without one in column 18, causes the coincidence circuit, consisting of diodes 261 and 262 and resistor 263 to be operated and line 241 to be Up.

The operation of a particular one of the four conventional coincidence circuits in the matrix network 237 determines whether the signs of two quantities are the same or different. If the signs are the same, these circuits will indicate whether they are plus (+) or minus (−), and if the signs differ, which quantity is plus (+) and which minus (−). That is to say, when the coincidence circuit consisting of diodes 248 and 249 and resistor 250 is operated, line 238 goes Up sufficiently to drive cathode follower 264 into conduction to cause output terminal 265 to go Up, thus indicating that the sign of column 10 is plus and the sign of column 18 is minus. In the event that column 18 is plus and column 10 is minus, line 241 is made sufficiently positive to drive cathode follower 266 into conduction and cause output terminal 267 to go Up.

Should the signs of the two quantities be identical, either plus or minus, line 239 or line 240 is Up. Two positive signs bring line 240 Up to operate diode 268, which offers a low impedance, and to cause output terminal 270 to go Up. Two negative signs bring line 239 Up, operating diode 269 and causing output terminal 270 to go Up. Output terminal 270 goes Up when the signs are the same in order to operate cathode follower 271 of the tens order control circuit 272 (FIG. 3B), and, thereby, to permit the tens order comparing circuit and the units order comparing circuit to take over in determining the relationship between the two quantities. However, if the signs are different, cathode follower 271 is not operated, and the pulse developed at either output terminal 265 or 267 controls the operation of subsequent circuits (see FIG. 4B).

It has been stated above that the comparing circuits are capable of determining whether any two quantities are equal or unequal. When one quantity is plus and one is minus, the sign comparing circuit 236 and the associated matrix network 237 develop a pulse at one of two output terminals 265 and 267. If the two signs are plus, the sign matrix network 237 develops a pulse at output terminal 270 to permit the highest order comparing circuit, in this case the tens order comparing circuit, to operate and to indicate the result of its comparison. The situation in the case of two quantities having minus signs is different, inasmuch as the smaller quantity is greater in the objective sense, that is in relation to zero. Therefore, this consideration requires that the comparison developed by the tens order and the units order circuits be reversed in order to register the true relationship between the two minus quantities.

Referring to the left part of FIG. 3A, there is shown the minus sign control circuit 282. Broadly this circuit comprises an inverter 283, cathode follower 284 and a differentiating circuit made up of capacitor 285, resistor 286 and diode 287. The minus sign control circuit is operated at a specific point of each machine cycle through the closure of cam contacts CC1, provided, of course, the signs of the two quantities being compared are minus. Once the minus sign control circuit is operated, the negative pulse developed by the differentiating circuit reverses the condition of the trigger circuits in the tens order and units order comparing circuits.

During the time interval that the record card is being sensed, that is from digit position 9 through digit position 12 (time intervals 1 to 12 in FIG. 8), cam contacts CC1 are open and the cathode of triode 283 is connected through resistor 288 to a +60 volt supply source. The grid of triode 283 is connected through resistors 286 and 247 to the same +60 volt source. Under these conditions, triode 283 cannot conduct and current cannot be caused to flow through its plate resistor 289.

However, the grid of tube 283 will become sufficiently positive for conduction two cycle points after brushes 17, associated with columns 10 and 18 of the record card, sense perforations (card index position 11) indicating that the two quantities under comparison are minus. In such a case, as explained above, the two trigger circuits in the sign comparing circuit 236 are turned On, thereby causing line 239 to go Up. This makes the grid of tube 283 more positive and allows this tube to conduct when the cam contacts CC1 are next closed.

At cycle point or time interval T13 (FIG. 8), cam contacts CC1 close to bring the cathode of tube 283 to ground potential, and the tube therefore conducts during this time interval. Capacitor 252, which connects the plate of tube 283 to the grid of cathode follower 284 discharges through resistor 253 and momentarily reduces conduction through cathode follower 284. The decreased current flow through resistor 290 causes capacitor 285 to become discharged. The negative pulse is transmitted through the discriminating circuit consisting of capacitor 285, resistor 286 and diode 287 to the grids of trigger tubes 291, 292, 293 and 294 in FIGS. 3B and 3C. Positive pulses which occur when cam contacts CC1 open are eliminated by this circuit.

The negative pulse transmitted to these four trigger circuits causes them to reverse their state of conductivity. For example, assuming that the quantity in columns 10, 11 and 12 of the record card is −24 and that the quantity in columns 18, 19 and 20 is −35, trigger 292 in the tens order comparing circuit (FIG. 3B) is turned On and trigger 294 in the units order comparing circuit (FIG. 3C) is turned On. This would indicate that the quantity −35 is objectively greater than the quantity −24. To correct this condition, the minus sign control circuit develops a negative signal at time interval T13 which reverses the condition of the tens order and units order trigger circuits so that, in our hypothetical example, trigger 291, in the tens order comparing circuit 295, is On and trigger circuit 293 in the units order comparing circuit 296 is On also. A signal is thereby developed at output terminal 265 indicating that the quantity in columns 10, 11 and 12 is actually greater than the quantity in columns 18, 19 and 20.

TENS ORDER CIRCUIT

Figure 3B:
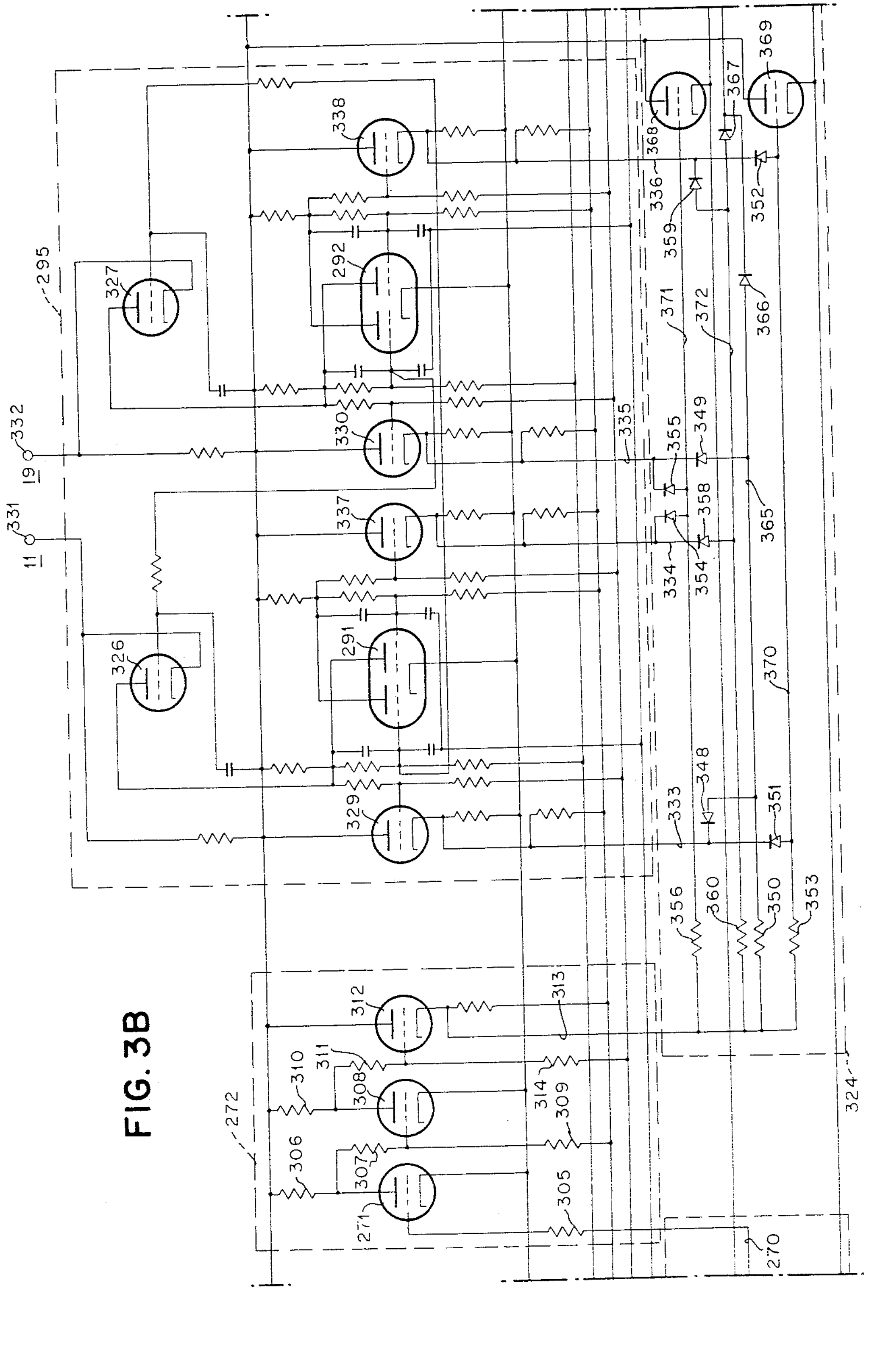
FIG. 3B shows the tens order circuit of a two-quantity evaluating system.

Referring to FIG. 3B, it may be seen that the pulse developed on line 270 (FIG. 3A) is made available through resistor 305 to the grid of inverter 271 of the tens order control circuit 272. The tube conducts, causing a voltage drop across resistors 306 and 307 which lowers the grid voltage of inverter 308. Inverter 308 becomes non-conductive. The absence of current flow in the plate circuit of inverter 308 prevents a voltage drop across resistor 310, and the positive voltage applied through resistor 311 to the grid of cathode follower 312 makes the latter sufficiently positive to conduct current and develop a positive pulse on line 313. This provides the necessary voltage for operating any one of the four coincidence circuits in the tens order matrix network 324.

Normally, when inverter 271 is not conducting, inverter 308 is conducting and the cathode follower 312 is incapable of producing a positive pulse on output line 313.

The grid of inverter 308 is connected through resistor 309 to the −100 volt source, and the grid of cathode follower 312 is connected through resistor 314 to a −250 volt source. The other side of the grid of inverter 308 is connected through resistors 306 and 307 to a +150 volt source, and so tube 308 is permitted to be conductive when no pulse exists on line 270.

Figure 1:
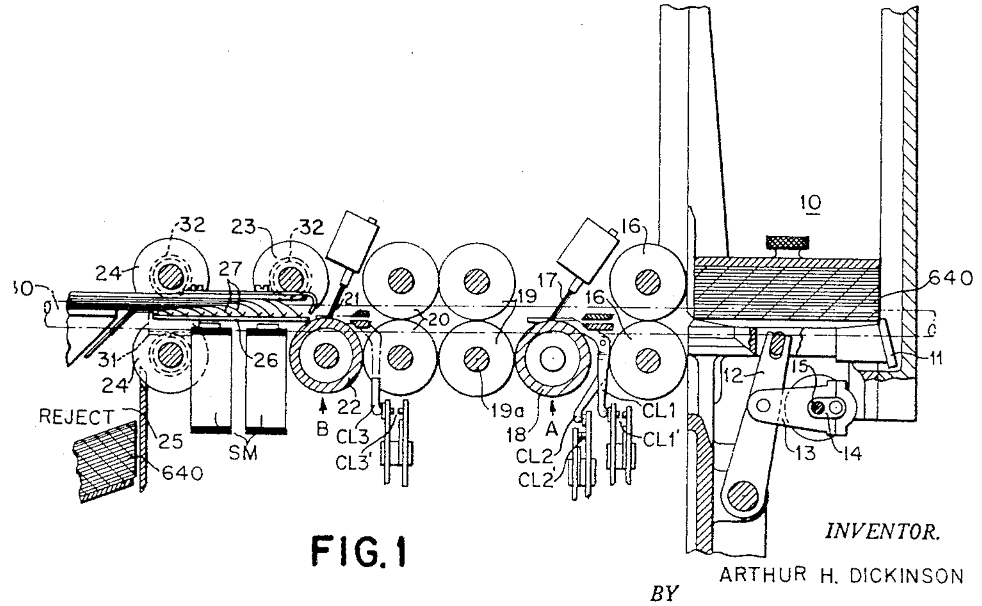
FIG. 1 is sectional elevation through the rear portion of a sorting machine.

Structurally the tens order comparing circuit 295 is identical to the sign comparing circuit 236 already examined. Functionally it differs from the sign comparing circuit only to the extent that its trigger circuits are capable of being reversed by the minus sign control circuit 282 when the signs of the two quantities under comparison are minus. The negative pulse developed by the differentiating circuit of the minus sign control circuit 282 of FIG. 1 is made available through an appropriate capacitor to the grids of trigger tubes 291 and 292, causing each of said tubes to return to the other of its two conditions.

More specifically, in a situation when the reading brushes do not sense any perforation in columns 11 and 19 of the record card, input terminals 331 and 332 are not grounded and control tubes 326 and 327 are therefore not operated. Trigger tubes 291 and 292 remain Off, maintaining cathode followers 329 and 330 conductive and lines 333 and 335 Up.

Should a perforation be read simultaneously in columns 11 and 19, input terminals 331 and 332 are grounded. Both inverters 326 and 327 are made conductive to convert trigger tubes 291 and 292 from the Off to the On condition, making cathode followers 337 and 338 conductive. When this occurs, lines 334 and 336 are Up.

In the event that a perforation is first sensed in column 11, control tube 326 is made conductive to turn On trigger tube 291 which makes cathode follower 337 conductive and causes line 334 to go Up. At this time the right side of trigger tube 291 conducts, causing the grid of the left side to go below cut off. This condition is reflected at the grid of control tube 327. Since the grid of control tube 327 is below cut off, control tube 327 is prevented from operating should its cathode be grounded during the remainder of this machine cycle. In this event, trigger tube 292 remains Off and cathode follower 330 conducts to produce a positive pulse on line 335.

A perforation sensed in column 19 before one in column 11, places input terminal 332 at ground and causes control tube 327 to be operated. This turns On trigger tube 292 by making its right side conductive. Cathode follower 338 is made conductive to bring line 336 Up at the same time that the bias on the grid of inverter 326 is reduced below cut off. Thus two of the cathode followers 329, 330, 337 and 338 are operating at any period causing their associated lines 333—336 to go Up.

At the bottom of FIG. 3B is the tens order matrix 324 whose operation is controlled by the tens order sign control circuit 272 and the tens order comparing circuit 295. The pulse developed by the tens order control circuit 272 on line 313 permits any one of the four coincidence circuits in the matrix network to be operated.

Figure 3C:
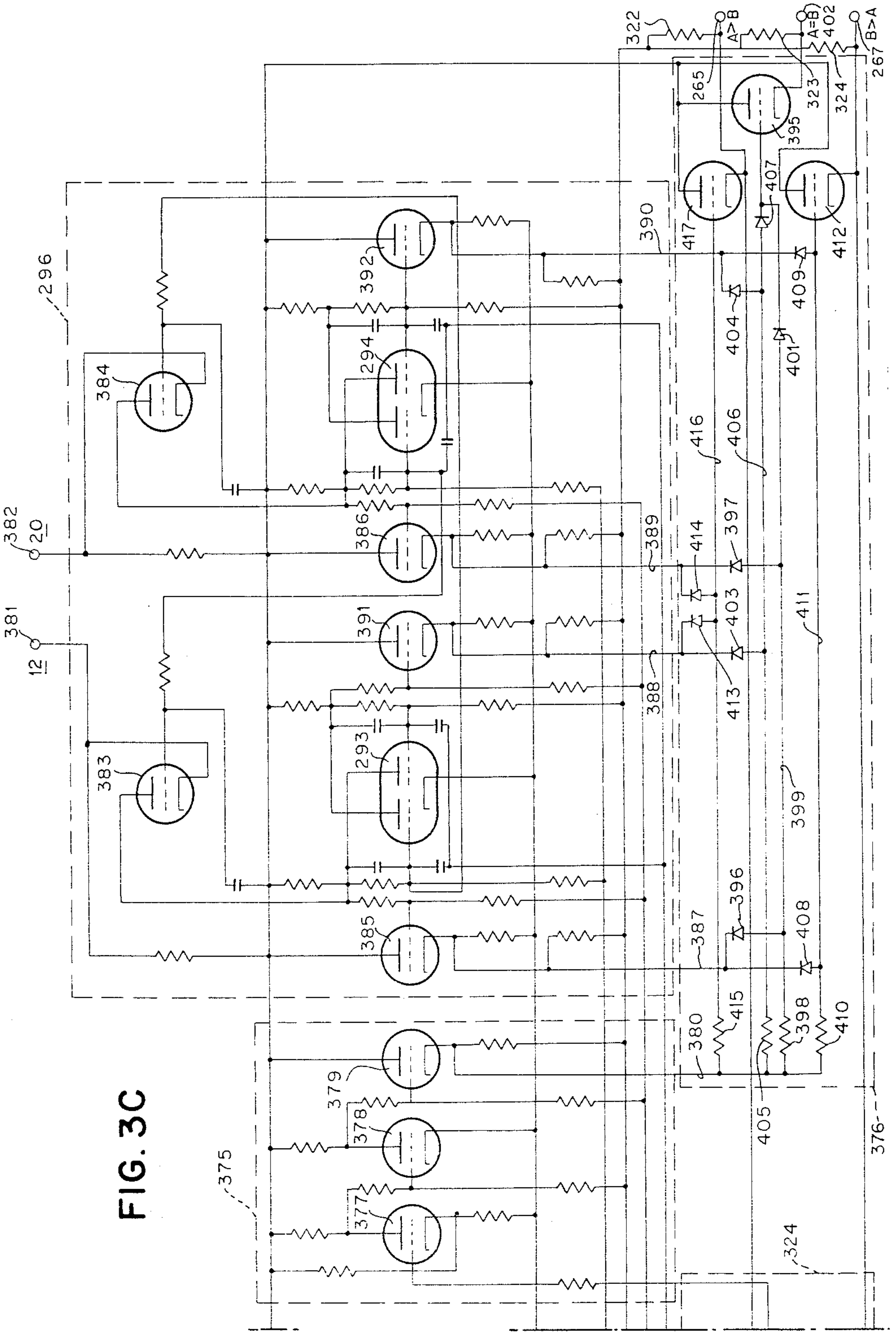
FIG. 3C shows the units order circuit of a two-quantity evaluating system.

Positive pulses on lines 333 and 335 operate the coincidence circuit, consisting of diodes 348, 349 and resistor 350, and thereby cause line 365 to go UP. The positive pulse developed on this line is coupled by diode 366 to the units order control circuit 375 (FIG. 3C).

Positive pulses on lines 333 and 336 operate the coincidence circuit, consisting of diodes 351, 352 and resistor 353, and thereby cause line 370 to go Up. The pulse on line 370 is applied to the grid of cathode follower 369, making this tube conductive and developing a positive pulse at output terminal 267 (FIG. 3C).

Positive pulses on lines 334 and 335 operate the coincidence circuit, consisting of diodes 354, 355 and resistor 356, and, as a result, cause line 371 to go Up. The positive pulse on line 371 makes the grid of cathode follower 368 sufficiently positive for conduction. The operation of cathode follower 368 causes a positive pulse to be developed at output terminal 265 (FIG. 3C).

Positive pulses on lines 334 and 336 operate the coincidence circuit, made up of diodes 358, 359 and resistor 360, and, thereby, cause line 372 to go Up. The pulse on line 372 is transferred through diode 367 to the units order control circuit 375 (FIG. 3C).

The particular lines 365, 370, 371 or 372 that is caused to go Up as a result of positive pulses developed by the cathode follower 312 of the tens order control circuit 272 and the cathode followers of the tens order comparing circuit 295 determines whether or not the units order control circuit 375 and therefore the units order matrix network 376 are to be operated. For example, if the digits sensed by the read brushes at columns 11 and 19 of the record card under inspection are unequal, one of the two output terminals 265 and 267 (FIG. 3C) go up and the units order control circuit 375 is not energized. Output terminal 265 is made to go Up when the digit of column 11 is greater than that of column 19, and in the same way output terminal 267 is made to go Up when the digit in column 19 is greater than that in column 11.

On the other hand, if the digits in these two columns are identical one of the two lines 365 and 372 is caused to go Up, thereby applying a positive pulse to the grid of cathode follower 377 in order to operate the units order control circuits 375 (FIG. 3C). The absence of a perforation in columns 11 and 19 of the record card, indicating an absence of a digit in said columns, causes line 365 to go Up, and the presence of perforations in identical rows of said columns 11 and 19 causes line 372 to go Up. In either case the next lower order control circuit is caused to be operated.

UNITS ORDER CIRCUIT

The units order circuit is identical to that already explained in the case of the tens order circuit. The units order control circuit 375 is made up of inverters 377, 378 and cathode follower 379. A positive pulse received from the higher order matrix network at the grid of inverter 377 makes the inverter 378 inoperative and cathode follower operative to produce a positive pulse on line 380. The absence of a positive pulse from the tens order matrix network 324 prevents the operation of inverter 377, thereby permitting the operation of inverter 378 which in turn prevents the operation of cathode follower 379. In the latter case output line 380 is Down and the units order matrix network 376 cannot be operated. It should be understood that the units order control circuit 375 is operated only when both the signs and the tens order digits of the two quantities under comparison are identical. If the sign and the tens order digits are not identical, the units order circuits cannot be operated and instead a signal is developed at one of the two output terminals 265 and 267.

Referring to the units order comparing circuit 296, it may be seen that input terminals 381 and 382 are connected to the sorter brushes corresponding to columns 12 and 20, respectively, of the card. The absence of perforations in columns 12 and 20 causes input terminals 381 and 382 to continue to be positive, thereby keeping control tubes 383 and 384 in their non-conductive condition and causing the trigger circuits 293 and 294, associated with said control tubes, to remain in their Off condition. This means that cathode followers 385 and 386 will be conductive and lines 387 and 389 will be Up.

The presence of perforations in identical rows of columns 12 and 20 will cause control tubes 383 and 384 to be conductive and trigger tubes 293 and 294 to be turned On. This means that cathode followers 391 and 392 will be operated and lines 388 and 390 will be Up.

A higher digit in column 12 than in column 20 will cause input terminal 381 to go Up before input terminal 382 goes Up. This has the effect of turning trigger tube 293 to the On condition for operating cathode follower 391. The effect is to cause line 388 to go Up. Since trigger tube 294 cannot be turned On after trigger tube 293 has been turned On, cathode follower 392 cannot be operated and therefore cathode follower 386 will remain conductive to pull Up line 389.

In the same way a higher digit column 20 will make input terminal 382 negative and thereby cause the right trigger tube 294 to be turned On. As a result, lines 387 and 390 will be Up at this time.

The units order matrix network 276 is identical to that already explained for the sign and tens order circuits with the exception that the determination of equality by the units order digits serves to operate a cathode follower 395 for the purpose of developing an output pulse, as will be explained. It will be recalled that the equality representing pulse developed by the sign and tens order circuits serves to drive the control circuit of the next adjacent order.

The pulses developed on line 380 by the units order control circuit 375 and on two of the lines 387, 390 by the units order comparing circuit 396 operate one of the four coincidence circuits constituting the units order matrix network 376. It should be understood that line 380 is brought Up only when the sign and tens order circuits develop equality representing pulses, whereas two of the four lines 387–390 emanating from the units order control circuit 296 are always Up due to the fact that two triggers in comparing circuit 396 are always in one or the other state of conductivity.

Assuming line 380 to be Up, the presence of positive pulses on lines 387 and 389 causes a coincidence circuit, consisting of diodes 396, 397 and resistor 398, to be operated and line 399 to be Up. The positive pulse on this line is then coupled by diode 401 to cathode follower 395 which is then made conductive, developing an output pulse at terminal 402.

The presence of positive pulses on line 388 and 390 operates the coincidence circuit, consisting of diodes 403, 404 and resistor 405, and thereby causes line 406 to go Up. The pulse on this line is then coupled by diode 407 to cathode follower 395, thereby making this tube conductive and causing a positive pulse to appear at output terminal 402.

The presence of positive pulses on lines 387 and 390 operates the coincidence circuit, consisting of diodes 408, 409 and resistor 410. The positive pulse thus developed on line 411 makes cathode follower 412 conductive and causes a positive pulse to appear in output terminal 267.

The simultaneous appearance of positive pulses on lines 388 and 389 operates a coincidence circuit, consisting of diodes 413, 414 and resistor 415, making line 416 go Up. This makes the grid of cathode follower 417 positive enough for conduction and causes an output pulse to appear at terminal 265.

A positive pulse may be developed at output terminals 265 and 267 by either the sign matrix network 237 (FIG. 3A), the tens order matrix network 324 (FIG. 3B), or the units order matrix network 376 (FIG. 3C). Of course, once the sign matrix network 237 develops a pulse at output terminal 265, the tens order and units order matrix networks are prevented from operating. On the other hand, if the tens order matrix network develops a pulse at one of the two output terminals 265 and 267, the units order matrix network 376 cannot be operated for developing an output pulse.

According to the rule governing the development of the equality representing pulses by the sign and tens order circuits, a positive pulse can only be developed at output terminal 402 through the operation of cathode follower 395 in the units order matrix network 376. It is necessary that the sign matrix network 237 develop an equality representing pulse before the next order or level, in this case the tens order matrix network 324, is operated. In the same way the tens order matrix network must develop an equality representing pulse before the units order matrix network 376 can be operated. Thus a positive pulse at output terminal 402 indicates that all levels of comparison, in this case the sign, tens and units order circuits, find the quantity under comparison to be identical in every respect.

Resistor 322 is the common cathode resistor for cathode follower 264 (FIG. 3A), cathode follower 368 (FIG. 3B), and cathode follower 417 (FIG. 3C). Resistor 324 is the common cathode resistor for cathode followers 266 (FIG. 3A), 369 (FIG. 3B), and 412 (FIG. 3C). Resistor 323 is the cathode resistor for cathode follower 395 (FIG. 3C).

THREE-QUANTITY EVALUATING SYSTEM

Figures 4, 4A:
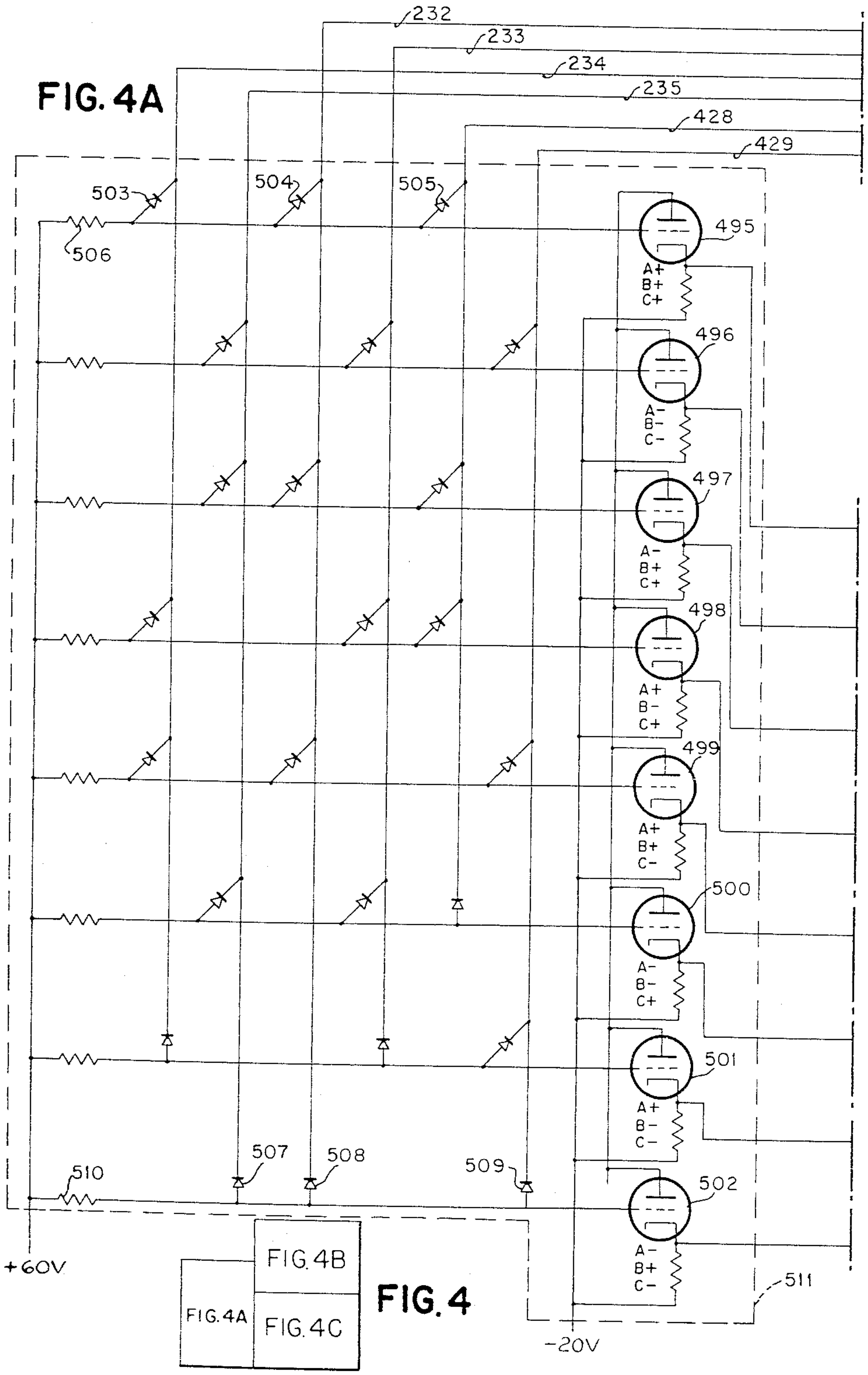
FIG. 4 is a block diagram of the three-quantity evaluating system illustrated in FIGS. 4A—4C.
FIG. 4A shows the sign controlled matrix circuit of a three-quantity evaluating system.
Figure 4B:
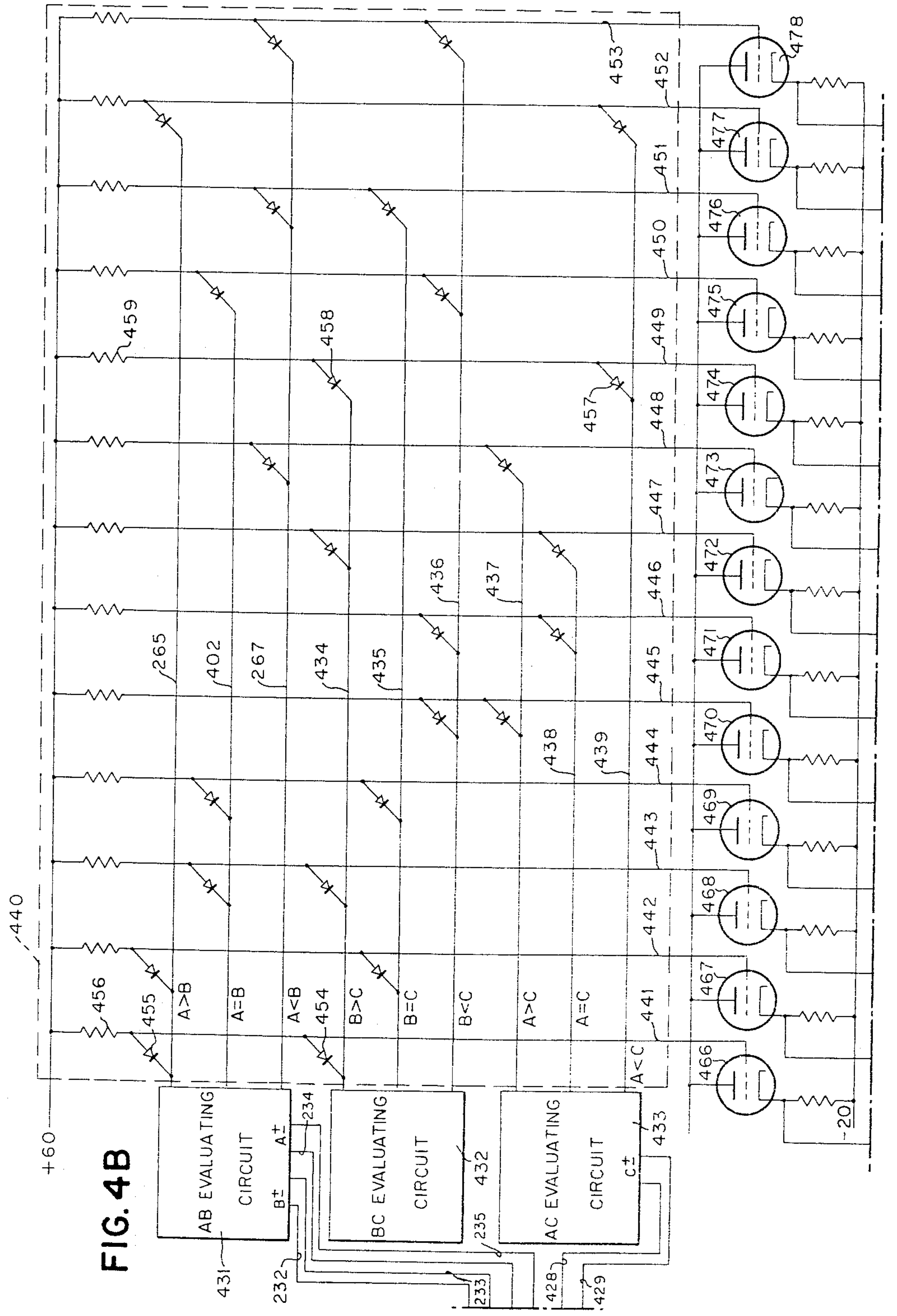
FIG. 4B shows the quantity controlled matrix circuit of a three-quantity evaluating system.
Figure 4C:
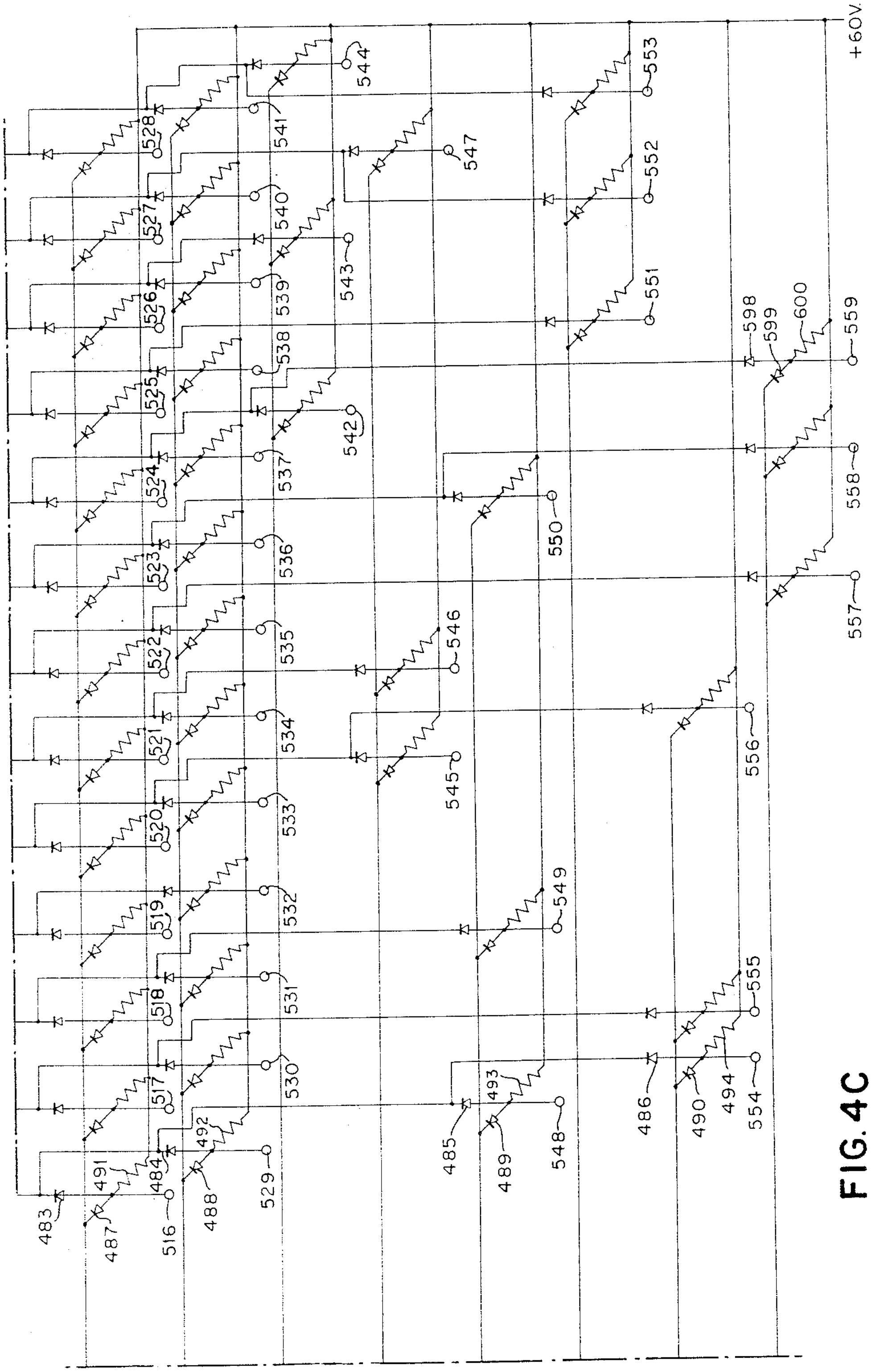
FIG. 4C shows a sign and quantity controlled matrix circuit of a three-quantity evaluating system.

FIGS. 4A–4C illustrate the connections for a three-quantity evaluating system. Each of the block diagrams 431—433 of FIG. 4B represent the circuits of FIGS. 3A–3C, already explained.

Referring to FIG. 4B the circuits of block diagram 431 determine the relationship between two quantities arbitrarily labeled A and B, the circuits of block diagram 432 determine the relationship between quantities B and C, and the circuits of block diagram 433 determine the relationship between quantities A and C.

Positive pulses are developed by the circuits of diagrams 431—433 to indicate the signs of the quantities under comparison and the nature of their relationship. The output lines in the left corner of FIG. 4B receive pulses indicating the signs of the three quantities being compared. This may be tabulated as follows:

| Terminal up | Sign | | |
|---|---|---|---|
| | A | B | C |
| 232 | | + | |
| 233 | | | |
| 234 | + | | |
| 235 | | | |
| 428 | | | + |
| 429 | | | − |

It should be noted that one of the sign indicating terminals of each of the three groups of sign indicating terminals associated with quantities A, B and C is always Up.

Figure 9:
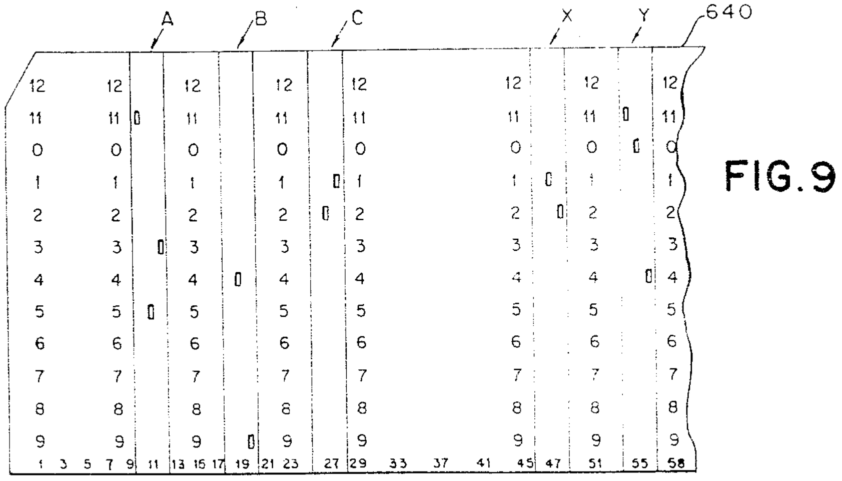
FIG. 9 illustrates a typical record card used in conjunction with the invention.

Referring to FIG. 9, it may be seen that quantity A has been arbitrarily located in columns 10–12 of the illustrated record card, quantity B in columns 18–20, and quantity C in columns 26–28. The brushes associated with these columns are connected to input terminals of the circuits of block diagrams 431—433. For example, the brushes of columns 10–12 are connected to three input terminals of block diagrams 431 and 433, the brushes of columns 18–20 are connected to three input terminals of blocks 431 and 432, and the brushes of columns 26–28 are connected to three input terminals of block diagrams 432 and 433.

Each one of the two-quantity evaluating circuits 431—433 develops a positive pulse at the end of an operation. It has already been demonstrated during the examination of FIGS. 3A–3C that a greater quantity in columns 10–12 (A) than in columns 18–20 (B) develops a positive pulse at output terminal 265 ($A>B$), a greater quantity in columns 18–20 (B) develops a positive pulse at output terminal 267 ($A<B$), and identical quantities in these columns develop a positive pulse at output terminal 402 ($A=B$).

In the same way a greater value in columns 18–20 (B) than in columns 26–28 (C) of the two-quantity evaluating circuit 432 causes a positive pulse to be developed on output line 434 ($B>C$), a greater quantity in columns 26–28 (C) causes a positive pulse to be developed on output line 436 ($B<C$), and an equality between the quantities causes a positive pulse to be developed on output line 435 ($B=C$).

In the case of the two-quantity evaluating circuit 433, a greater quantity in columns 10–12 (A) than in columns 26–28 (C) develops a positive pulse on output line 437 ($A>C$), a greater quantity in columns 26–28 (C) develops a positive pulse on line 439 ($A<C$), and an equality between the quantities in columns 10–12 (A) and 26–28 (C) develops a positive pulse on line 438 ($A=C$).

The relationship indicating pulses developed by the three two-quantity evaluating circuits represented by block diagrams 431—433 are then delivered to conventional matrix network 440. The pulses developed by circuits 431—433 are fed to various ones of the coincidence circuits, but only one of these coincidence circuits operate to produce a positive pulse on one of the lines 441—453. For example, in the case where quantity A is greater than quantity B and quantity B is greater than quantity C, positive pulses are developed on lines 265, 434 and 437. The pulses developed on lines 2, 5 and 434 operate the coincidence circuit consisting of diodes 454, 455 and resistor 456 and cause a positive pulse to be developed on line 441. The pulse on line 437 is not used and a two-input coincidence circuit rather than a three-input coincidence circuit can be employed, because it follows that if $A>B$ and $B>C$ then $A>C$.

Table 1 illustrates the various relationships which are possible in a three-quantity comparison. Eight possible sign combinations (A+, B+, C+, etc.) are shown at the top of the table. Below each of the sign combinations are shown all possible relationships between the three quantities having a certain sign relationship. For example, when all the signs are plus (+), thirteen possible relationships exist. The numbers 441–453 on the right show which line of thirteen possible relationship indicating lines (see FIG. 4B) is Up at any time. The numbers 516–559 at the bottom of the table indicate which terminal number (see FIG. 4C) of the final relationship indicating terminal numbers is Up to indicate that the final relationship between the quantities is $A>B>C$, with all signs plus (+).

*Table 1*

| | +A +B +C | −A −B −B | −A +B +C | +A −B +C | +A +B −C | −A −B +C | +A −B −C | −A +B −C | Line up |
|---|---|---|---|---|---|---|---|---|---|
| 1 | $A>B>C$ | $-A>-B>-C$ | | | $A>B>-C$ | | $A>-B>-C$ | | 441 |
| 2 | $A>B=C$ | $-A>-B=-C$ | | | | | $A>-B=-C$ | | 442 |
| 3 | $A=B>C$ | $-A=-B>-C$ | | | $A=B>-C$ | | | | 443 |
| 4 | $A=B=C$ | $-A=-B=-C$ | | | | | | | 444 |
| 5 | $A>C>B$ | $-A>-C>-B$ | | $A>C>-B$ | | | $A>-C>-B$ | | 445 |
| 6 | $A=C>B$ | $-A=-C>-B$ | | $A=C>-B$ | | | | | 446 |
| 7 | $B>C=A$ | $-B>-C=-A$ | | | | | | $B>-C>-A$ | 447 |
| 8 | $B>A>C$ | $-B>-A>-C$ | | | $B>A>-C$ | | | $B>-A>-C$ | 448 |
| 9 | $B>C>A$ | $-B>-C>-A$ | $B>C>-A$ | | | | | $B>-C>-A$ | 449 |
| 10 | $C>B=A$ | $-C>-B=-A$ | | | | $C>-B=-A$ | | | 450 |
| 11 | $C=B>A$ | $-C=-B>-A$ | $C=B>-A$ | | | | | | 451 |
| 12 | $C>A>B$ | $-C>-A>-B$ | | $C>A>-B$ | | $C>-A>-B$ | | | 452 |
| 13 | $C>B>A$ | $-C>-B>-A$ | $C>B>-A$ | | | $C>-B>-A$ | | | 453 |
| Terminal up | 516 to 528 | 529 to 541 | 542 to 544 | 545 to 547 | 548 to 550 | 551 to 553 | 554 to 556 | 557 to 559 | |

Still referring to FIG. 4B, it may be seen that each of the output terminals 441—453 is connected to a particular cathode follower 466—478. Whenever any one of these terminals goes Up, the corresponding cathode follower is made fully conductive. For example, when line 441 is made positive, the grid of cathode follower 466 goes positive and makes this tube conductive. The pulse developed in the cathode circuit of this tube is made available to diodes 483, 484, 485 and 486, each of said diodes constituting a part of a different coincidence circuit. The other diodes in each of the four coincidence circuits are 487, 488, 489 and 490. However, these latter four diodes receive their positive pulses from corresponding cathode followers 495, 496, 499 and 501, whose operation is controlled by pulses developed by the sign circuits of blocks 431 and 433 of FIG. 4B.

As indicated in FIG. 4A eight coincidence circuits each consisting of three diodes and a resistor serve to indicate all possible sign combinations. The operation of any one of these coincidence circuits in turn makes the associated cathode follower conductive. The pulse thus developed by one of these eight cathode followers in the matrix network 511 is delivered to a number of two-input coincidence circuits (FIG. 4C).

Referring to FIG. 4A, let us assume that output lines 234 (A is +), 232 (B is +) and 428 (C is +) are positive. In this condition the coincidence circuit, composed of diodes 503, 504, 505 and resistor 506, is operated. This makes the grid of cathode follower 495 sufficiently positive for it to conduct and to develop a positive pulse for diode 487. Diodes 487, 483 and resistor 491 make up a coincidence circuit. When cathode followers 466 and 495 are conductive simultaneously, a positive pulse is developed at output terminal 516 to indicate that the quantitative relationship is $A>B>C$ and the signs of the quantities are positive.

Referring to Table 1, it may be seen that the general relationship wherein A is greater than B and B is greater than C may be expressed in three other ways, namely $-A>-B>-C>$, $A>B>-C$ and $A>-B>-C$. In the first case a positive pulse is developed at output terminal 529, in the second case it is developed at ouput terminal 548, and in the third case it is developed at output terminal 554. Thus Table 1 illustrates all possible relationships between three quantities and the terminal points in FIG. 4C at which the relationship representing pulses are developed.

Table 1 illustrates that there are eight possible sign combinations and thirteen quantity relationships between three quantities. Each sign combination is represented by a different cathode follower in the matrix network 507 of FIG. 4A. The first sign combination (+A, +B, +C) is represented by cathode follower 495, the second sign combination (—A, —B, —C) by cathode follower 496, and so on down to the last sign combination (—A, +B, —C) represented by cathode follower 454.

In the same manner, each quantity relationship is represented by a cathode follower. That is to say, when $A>B>C$, $-A>-B>-C$, $A>B>-C$ and $A>-B>-C$, indicating all possible combinations in which quantity A is greater than quantity B and quantity B is greater than quantity C, cathode follower 466 in FIG. 4B is operated. For the quantity relationship where A is greater than B and B equals C, cathode follower 467 is operated. In the same manner, pulses representing the other quantitative relationships serve to operate the other cathode followers 468—478 of FIG. 4B. The operation of a particular one of the sign relationship indicating cathode followers 495—502 and a particular one of the quantity relationship indicating cathode followers 466—478 determines at which output terminal 516—559 the final relationship representing pulse is to appear.

TWO-QUANTITY EVALUATING SYSTEM

Figure 5:
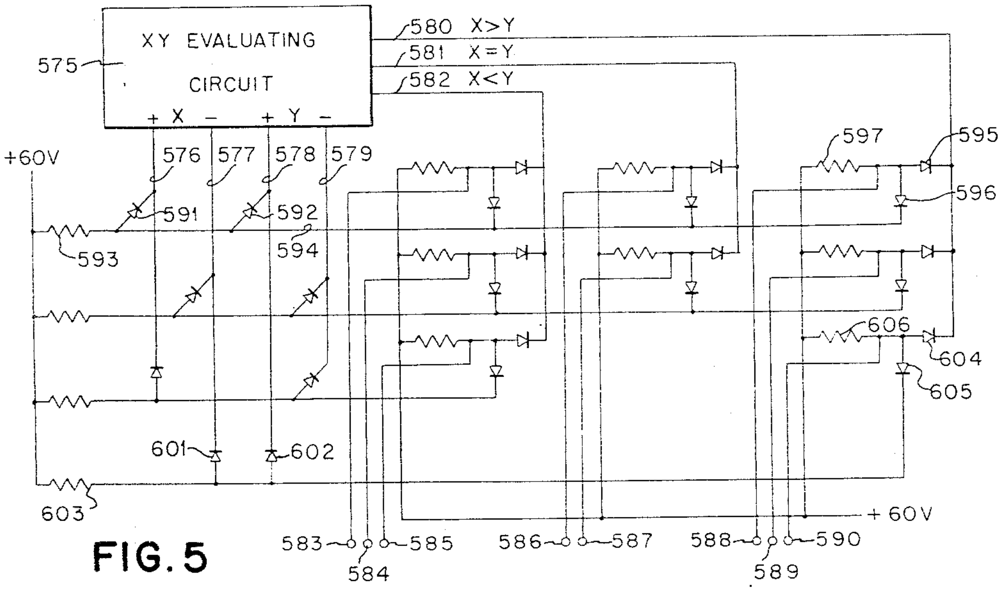
FIG. 5 shows a two-quantity evaluating system.

FIG. 5 illustrates a two-quantity evaluating system which is capable of determining the sign and quantity relationship between two quantities, arbitrarily labeled X and Y. Block diagram 575 like block diagrams 431—433 represents the sign, tens order and units order circuits of the type illustrated in FIGS. 3A–3C. However, it should be understood that any number of orders of the two quantities may be compared by increasing the number of circuits. It should also be understood that a two-quantity evaluating system may serve to evaluate any two of the quantities being simultaneously evaluated by a three-quantity evaluating system.

It may be seen by reference to FIG. 9 that the X and Y quantities are located in columns 46–48 and 54–56, respectively, of a record card. This means that the corresponding input terminals of the X, Y comparing circuits 575 will be connected to brushes in these columns. As already explained, when during the course of a card sensing operation a perforation is detected in any of the X, Y columns, the corresponding trigger circuit of the X, Y comparing circuits 575 is turned On. The matrix networks within the X, Y comparing circuits 575 are then operated to produce two sign representing pulses on output lines 576—579 and a quantity representing pulse on one of the output lines 580—582.

Eight output terminals 583—590 are provided in FIG. 5, indicating that the maximum possible number of X, Y comparisons is eight. This may be seen more clearly by referring to Table 2.

*Table 2*

| | +X +Y | −X −Y | −X +Y | +X −Y | Line Up |
|---|---|---|---|---|---|
| 1 | $X>Y$ | $-X>-Y$ | | $X>-Y$ | 580 |
| 2 | $Y>X$ | $-Y>-X$ | $Y>-X$ | | 582 |
| 3 | $X=Y$ | $-X=-Y$ | | | 581 |
| Terminal Up | 588, 583, 586 | 589, 584, 587 | 590 | 585 | |

The above table shows that three combinations are possible when the signs are identical and only one combination is possible when the signs are different. This should be obvious because no negative quantity can ever be greater than a positive one.

Further, with regard to Table 2, it may be seen that line 580 is Up whenever one of the three $X>Y$ relationships exist; line 582 is Up whenever one of the $Y>X$ relationships exist; and line 581 is Up whenever X and Y are equal. Whenever line 580 is Up and the signs of the X, Y quantities are plus, output terminal 588 is made to go Up. If line 580 is Up and both signs are minus, a positive pulse is developed at output terminal 589. Similarly, the condition of all the other output terminals may be determined by knowing the condition of the signs and which one of the lines 580—582 is Up.

The two-input coincidence circuits of FIG. 5 are identical in operation to those already explained. For example, assuming that the sign of the X, Y quantities is plus and that therefore output lines 576 and 578 are positive, the coincidence circuit consisting of diodes 591, 592 and resistor 593 is operated to develop a positive pulse on line 594. If, at the same time, the X quantity is greater than the Y quantity, a positive pulse is developed on output line 580. The two pulses on lines 580 and 594 operate the coincidence circuit made up of diodes 595, 596 and resistor 597 in order to cause output terminal 588 to go positive, indicating that $X>Y$ and both signs are positive. The other coincidence circuits are operated in an identical manner according to the sign and quantity relationship to produce positive pulses at the other output terminals.

GROUP COMPARISON

Once it has been determined what the relationship is between quantities A, B and C (FIGS. 4A–4C) and quantities X and Y (FIG. 5) it may then be desirable to determine the relationship between the results of these two comparisons. That is to say, for example, to discover if $A>B>C$, with all signs plus, occurs at the same time that $X>Y$, with both signs plus, it is merely necessary to connect the output terminals of FIG. 5 and the desired ones of the output terminals of FIG. 4C to a conventional two-input coincidence circuit, as illustrated in FIG. 6.

Figures 6, 7:
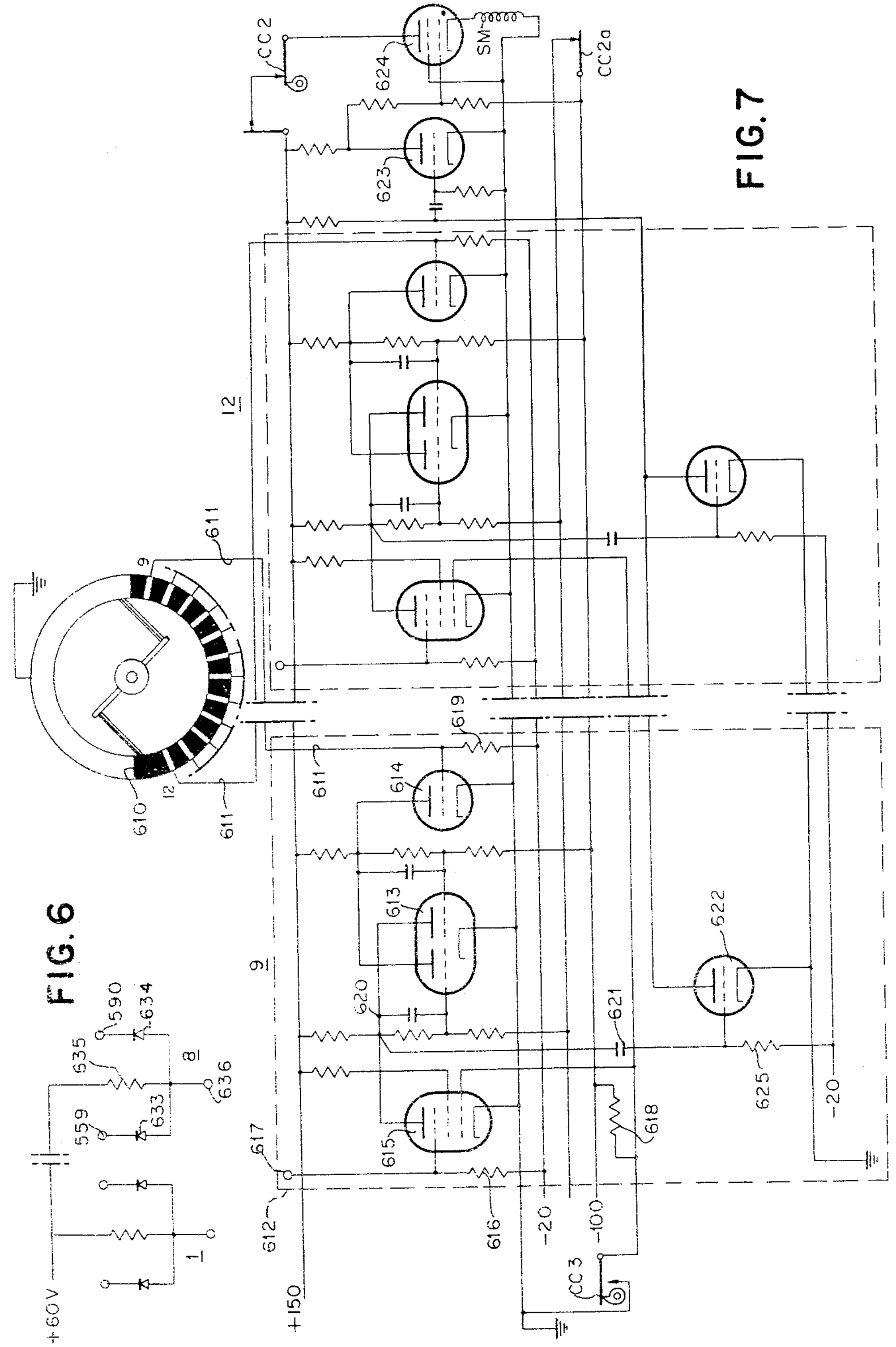
FIG. 6 shows a group of coincidence circuits.
FIG. 7 illustrates one form of storage circuit used in the selection of receiving pockets.

To compare any eight results of the A, B, C comparison with all possible results of the X, Y comparison, it is necessary to employ eight coincidence circuits which may be of the type shown in FIG. 6. The resistor of each of the coincidence circuits is connected to a +60 volt source. One of the diodes of each coincidence circuit is connected directly (or through a plugboard not shown), to one of the output terminals 516—559 (FIG. 4C) and the other diode is connected in the same manner to one of the output terminals 583—590 (FIG. 5). Only when positive pulses arrive simultaneously from the A, B, C circuits and the X, Y circuits are one of the coincidence circuits of FIG. 6 operated.

STORAGE DEVICE

FIG. 7 illustrates a conventional storage device which is capable of storing a pulse representative of a certain comparison for a time interval sufficient to bring about a transfer of the record card from the sorter sensing station to one of thirteen receiving pockets, twelve selectable pockets and a reject pocket. In a sorting machine using the evaluating circuits according to the invention, a card is analyzed or sensed in one machine cycle and the pocket selection is made at the next machine cycle. Storing of the final relationship indicating pulses during this time interval permits the evaluating circuits to be free for the following card analysis. The storage circuit may be of any suitable type, for example mechanical, electromechanical or electronic, although, as described, it comprises a plurality of conventional electronic trigger circuits and related switching means.

More specifically, the storage device of FIG. 7 consists of twelve trigger circuits labeled 9, 8 . . . 11, 12 corresponding to the twelve selectable sorter pockets 25 illustrated in FIG. 2. An emitter 610 sequentially grounds the lines 611 and in this way switches Off any trigger which had previously been triggered On, as will be explained. During the time that a trigger circuit is switched Off, a pulse is generated which serves to energize the sorter magnet SM.

Typical of the twelve storing circuits is the No. 9 pocket storing circuit 612. It may be seen that this circuit comprises a duo-triode trigger tube 613, an inverter tube 614 and a pentode control tube 615. Normally the suppressor grid of pentode 615 obtains a negative bias through resistor 616, which prevents it from conducting. In the event that a positive pulse is impressed at input terminal 617 at the end of a comparing operation, the suppressor grid of tube 615 is made sufficiently positive so that the tube conducts. However, this conduction will only occur at time interval T15 (FIG. 8), inasmuch as control cam contacts CC3 ground the control grid of pentode 615 at this interval. At all other time intervals of a machine cycle, cam contacts CC3 are open and the control grid of pentode 615 is maintained below cut off by resistor 618, which is connected to a −100 volt supply. Since the pulse at input terminal 617 is made available prior to time interval T15 and continues to be available at this time interval, the pentode 615 is made conductive.

The operation of pentode 615 serves to switch trigger tube 613 from the Off condition (left side conducting) to the On condition (right side conducting). Once turned On, the trigger circuit will continue to be On until inverter 614 is operated in the next or second machine cycle.

In the first time interval or cycle point of the second machine cycle, the record card moves toward the "9"

shoot blade tip. The brushes of emitter 610 cause a momentary shorting of the "9" segment on the emitter to ground. Inverter 614 is normally non-conductive because its grid is connected through resistor 619 to a −20 volt source. However, when segment "9" of emitter 610 is grounded, the grid of tube 614 is grounded, and, therefore, the tube conducts to switch the trigger tube 613 from its On condition (right side conducting) to its Off condition (left side conducting).

As trigger tube 613 is switched Off, a highly positive pulse is developed at point 620 and coupled through capacitor 621 to the grid of inverter 622. The negative pulse thus developed by inverter 622 is fed to inverter tube 623 which is now made non-conductive. A positive pulse is thus made available to the control grid of thyratron 624, causing the latter to fire and energize sorter magnet SM. The magnet opens a path for the card through the "9" shoot into a "9" pocket which had been selected for the card of a certain item or data relationship.

At time interval T16 the cam contact CC3 will again be opened (FIG. 8), thereby disconnecting the control grids of all pentodes, similar to pentode 615, from ground potential and preventing the switching On of the associated trigger circuits until time interval T15 of the next machine cycle. All the trigger tubes, including trigger tube 613, in the storing device are reset by the opening of cam contacts CC2*a* at time interval T14 of the next succeeding machine cycle.

Cam contacts CC1 are closed only at time interval T13, in order to reverse the condition of the trigger circuits in the tens order and units order comparing circuits (see FIGS. 3A–3C) when the sign circuit (FIG. 3A) determines that both signs of the quantities under comparison are minus. If the signs are not both negative, the closure of these cam contacts will have no effect upon the circuits of FIGS. 3A–3C. In operation, card position "11," the sign position, is sensed two cycle points before cam contacts CC1 close for a trigger reversing operation. This means that an erroneous relationship representing pulse is made available to the storage circuits of FIG. 7 before the error is corrected at time interval T13. However, the erroneous pulse has no effect on the storage circuits since the trigger tubes therein cannot be turned on before two cycle points later, that is time interval T15. In this way, the correct relationship indicating pulse developed at time interval T13 serves to operate a storage trigger, as the erroneous relationship indicating pulse is cancelled.

Contacts CC2*a* which are normally closed, connect the grid of the left triode of the duo-triode trigger tubes, similar to tube 613, to a −100 volt supply. However, at time interval T14 (FIG. 8) cam contacts CC2*a* open disconnecting the control grid of all the left triodes of the duo-triode trigger tubes from this supply source and causing the trigger stage, in our hypothetical situation tube 613, which happens to be On during this machine cycle to be turned Off.

In the same way the thyratron tube 624 is turned Off during the next machine cycle prior to the turning On of one of the trigger circuits in the storage device. Cam contacts CC2 are opened at time interval T14 disconnecting the plate of tube 624 from the +150 volt supply and making the tube non-conductive.

Cam contacts CC2 are normally closed (FIG. 8) to connect the plate of thyratron 624 to a +150 volt source. Card lever contacts CLC is closed when the first card fed into the machine is in position to be analyzed. It serves to disable the machine when a card fails to feed into the machine or when the last card runs out.

Figure 8:
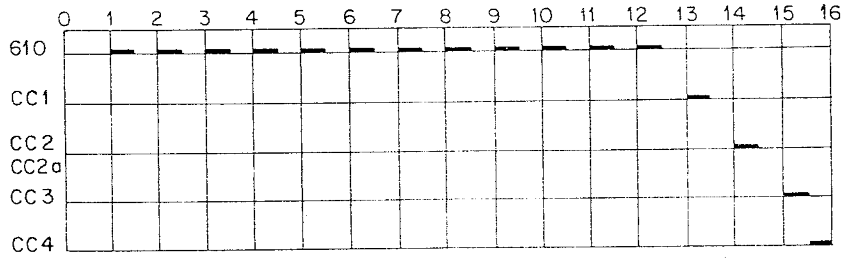
FIG. 8 shows a time chart for cam operation.

Referring specifically to FIG. 8, it may be seen that a machine cycle is divided into sixteen time intervals or cycle points, a cycle point being represented by the travel of a record card from one position to another, for example, from 9 to 8. The record card is entered into the sensing station with the "9" position first, the "8" position next and in this fashion through the "12" position.

During this time, cam contacts CC4 are closed, permitting the operation of all trigger circuits of the two-quantity evaluating circuits (see FIGS. 3A–3C). However, near the end of a machine cycle, that is time interval T16, cam contacts CC4 open to reset the trigger circuits in the two-quantity comparing circuits.

RECORD CARD

FIG. 9 is a portion of a card 640 which may be used with the sorting machine described above. The quantities A, B, C, X and Y are shown occupying five distinct fields of three columns each, although it should be understood that any other fields may also be used to display these quantities. The three columns of each field carry quantities of two orders and a related sign. For example, and as previously explained, quantity A has its sign in column 10, a tens order digit in column 11 and a units order digit in column 12. In the same way, quantity B has its sign in column 18, its tens order digit in column 19 and its units order digit in column 20. The columns associated with quantities C, X and Y display the information in the same columnar sequence. Actually more than three columns can be used in any quantitative field provided that additional comparing circuits are employed to make a comparison of the additional digits.

OPERATION

The operation of the evaluating circuits, according to the invention, will now be described in terms of the information recorded on the record card 640 of FIG. 9. There it will be seen that quantity A is —53 inasmuch as column 10 has a perforation at position 11, column 11 has a perforation at position 5 and column 12 has a perforation at position 3. A perforation at position 11 indicates a minus (—) sign, and the absence of such a perforation represents a plus (+) sign. Quantity B with perforations at positions 4 and 9 of columns 19 and 20, respectively, represents +49, and quantity C is +21 because positions 11, 2 and 1 of columns 26, 27 and 28, respectively, are perforated. In the same way the quantities in fields X and Y may be ascertained to be +12 and —04, respectively.

The sorting machine used in conjunction with this invention is wired so that the card 640 which contains the relationships $B>C>A$ and $X>Y$ will be deposited in receiving pocket "9." Furthermore, it is understood that to determine the relationship between three quantities three groups of comparing circuits similar to those illustrated in FIGS. 3A–3C must be used. Since one group of these comparing circuits determines the relationship between quantities A and B, it is necessary that brushes 17 (FIG. 1) associated with columns 10–12 (for quantity A) and columns 18–20 (for quantity B) be connected either directly or through a plugboard (not shown) to the input terminals of one group of comparing circuits. Furthermore, since the relationship between quantities A and C and between B and C is determined by two other sets of comparing circuits like those of FIGS. 3A-3C the brushes associated with the columns in all these fields must be connected to the inputs of the other two sets of comparing circuits. In the same way the brushes associated with columns 46–48 (for quantity X) and columns 54–56 (for quantity Y) are connected to the input of a fourth group of comparing circuits.

Referring again to FIG. 1, the record card 640 is moved out of the hopper 10 between rollers 16 and into the sensing station represented by brushes 17 and contact roll 18. The card 640 is moved forward with the "9" position to be read first at the first cycle point or time interval T1 (FIG. 12), the "8" position next at time interval T2, and so on through the "11" or sign position at time interval T11. The first perforation to be sensed on the record card is the "9" position in column 20 of the B field. Referring to FIG. 3C, it may be seen that when a perforation appears in column 20 input terminal 382 is caused to be grounded, turning On the right trigger circuit of the units order comparing circuit 296. This makes cathode follower 392 conductive and line 390 positive.

During the next cycle point or time interval T2, the "8" position is presented at the sensing station, but since no perforation is detected the circuits remain undisturbed. The card is moved along three more cycle points until position "5" is sensed, at which time the brush associated with column 11 is caused to be grounded and the input terminal 331 (FIG. 3B) is also grounded. This causes the left trigger circuit of the tens order comparing circuit 295 to be turned On, making cathode follower 337 conductive and developing a positive pulse on line 334.

At the next cycle point or position "4" on the record card 640, brush 17 associated with column 19 detects a perforation and causes the input terminal 332 (FIG. 3B) to be grounded. However, since input terminal 331 had previously been grounded to operate the left trigger circuit of the tens order circuit 295 the grounding of input terminal 332 is incapable of turning on the right trigger circuit of the tens order comparing circuit 295. For the same reason, the sensing of a perforation at position "3" of column 12 is incapable of operating its associated trigger in the units order comparing circuit 296 due to the turning On of the left trigger circuit in this comparing circuit at the time that a perforation was detected in position "5" of column 11.

The record card 640 continues its movement through the reading station without further effect on the A and B comparing circuits until position "11" is under the brushes, at which time the brush 17, associated with column 10, is grounded, causing input terminal 201 of the sign comparing circuit 236 to be grounded also. This operates the right trigger of sign comparing circuit 236 and causes a pulse to be developed at output terminal 235. Since the left trigger circuit of sign circuit 236, representing the sign of quantity B is not turned On, a pulse is developed at output terminal 232. The condition of the trigger circuits in the sign comparing circuit 236 is such, at this time, that a pulse is developed on line 241 which operates cathode follower 266 and causes a pulse to be developed at output terminal 267 (FIG. 3C). In this case the sign of the numbers determines their relationship despite the fact that quantity B is numerically smaller than quantity A. The condition of the triggers in FIG. 3B is not permitted to develop a signal at output terminal 265 to indicate that quantity $A>B$ because the sign matrix network 237 does not develop a pulse at its output line 270 and thus the tens order control circuit 272 is not operated. The units order control circuit 375 also cannot be operated to permit the units order matrix network to develop an output pulse.

In terms of FIG. 4B, the following takes place. The block diagram 431, corresponding to the circuits of FIGS. 3A–3C, discussed above, develops positive pulses at output terminals 232 and 235 to indicate that quantity A is minus and quantity B is plus, and a positive pulse is also developed on line 267 to indicate that $B>A$. In the case of the circuits of block diagram 432, since quantity C is negative and quantity B is positive, a positive pulse is developed on output line 434 to indicate $B>C$. In the same manner, the circuits of block diagram 433 develop a positive pulse at output terminal 429 to indicate that quantity C is minus and another positive pulse on line 439 to indicate that $A<C$. Quantity C is less negative than quantity A, and, therefore, registers as the greater of the two quantities.

Simultaneously with the comparison of the A, B and C quantities by the identical comparing circuits of block diagrams 431, 432 and 433 (FIG. 4B) a comparison is made of quantities X and Y by the brushes associated with the X and Y fields and the results of this comparison are developed by block diagram 575 (FIG. 5). Because the Y quantity is minus, the input terminal of block 575, associated with column 54, is grounded, thereby operating a sign trigger circuit associated with the Y quantity, and causing a signal to be developed through a matrix network (identical to network 237 in FIG. 3A) on output line 580. Sign pulses are developed on lines 576 and 579. Thus it is seen that the comparing circuits complete the examination of the five quantities read out by corresponding brushes 17 when the record card has its "11" or sign position at the reading station.

Returning to FIG. 4B, the output pulses on lines 267 ($A<B$), 434 ($B>C$) and 439 ($A<C$) operate the coincidence circuit, consisting of diodes 457, 458 and resistor 459, to make cathode follower 474 conductive. The sign indicating pulses at input terminals 232, 235 and 429 operate a coincidence circuit, consisting of diodes 507—509 and resistor 510, thereby making cathode follower 502 conductive. The pulses developed by cathode followers 502 and 474 operate a coincidence circuit, consisting of diodes 598, 599 and resistor 600, which produces a positive pulse at output terminal 559. A pulse at this terminal indicates that $B>-C>-A$.

Returning to FIG. 5, the sign representing output terminals 577 and 578 are Up, causing the coincidence circuit, represented by diodes 601, 602 and resistor 603, to be operated. The pulse developed by this coincidence circuit and the pulse on line 580, indicating $X>Y$, are delivered to a coincidence circuit, consisting of diodes 604, 605 and resistor 606. This coincidence circuit then develops a pulse at its output terminal 590, indicating that $X>-Y$.

The pulses developed at output terminals 559 (FIG. 4C) and 590 (FIG. 5) are delivered to a conventional coincidence circuit made up of diodes 633, 634 and resistor 635 (FIG. 6). This coincidence circuit then develops a positive pulse at its output terminal 636 to indicate that the relationship of the quantities in the five fields of the record card is $B>-C>-A$ and $X>-Y$. Assuming that the sorting machine is wired to deliver a card having this quantity relationship to pocket "9," the pulse at terminal 636 is immediately made available to input terminal 617 of the storing circuits (FIG. 7). However, pentode 615, associated with input terminal 617, cannot be operated at this time because cam contacts CC3 continue to be open. At time interval T14, or three cycle points after the "11" or sign position of the record card has been sensed, all the trigger circuits and the thyratron of the storing circuits in FIG. 7 are reset. At the next time interval T15, cam contacts CC3 close, thereby permitting pentode 615 to be operated by the pulse at input terminal 617. Tube 615 causes trigger tube 613 to be turned On. When the brushes of emitter 551 next ground the "9" segment, inverter 619 is operated, causing the trigger tube 613 to be turned Off. The effect of this turning Off is to make inverter 622 conductive and inverter 623 non-conductive. Thyratron 624 fires, energizing sorter magnet SM and causing the record card to be delivered to receiving pocket "9" (FIG. 2).

At time interval T16 (FIG. 8), cam contacts CC4 (FIG. 3A) open to cause all the triggers in the comparing circuits of FIGS. 3A–3C to be reset in preparation for the next card cycle.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data comparing apparatus comprising a plurality of seriately disposed normally inoperative comparing devices, each having input terminals and output terminals, and operative to compare two data significant signals applied to the said input terminals and to produce at said output terminals a different potential status for each of the two possible relationships of inequality and the single relationship of equality; means in each of said devices operative responsive to the equality manifesting potential status of the preceding device for rendering the device operative; data manifesting means adapted to produce data significant signals manifestive of the respective signs and magnitudes of two plural-ordered data; means coupling the data manifesting means to the input terminals of the said devices such that the sign significant signals of both data are applied to said first device and the corresponding ordered magnitude significant signals of both data are applied to the input terminals of respective succeeding ones of said devices; means in the first of said devices for detecting the presence of two negative sign values, and operative responsive thereto to reverse the inequality significance of all succeeding devices; means coupling each of the corresponding inequality potential status manifestations of all said devices to a corresponding common inequality manifesting line; means operative responsive to the equality manifesting potential status of the final of said devices for manifesting an equal comparison in both sign and magnitude of both compared numbers; and means for selectively rendering the first said device operable.

2. An apparatus for comparing two data items manifested by data signals having both sign and magnitude significance, comprising sign comparing means operative responsive to the data signals having sign significance to produce a unique output potential status for each of the four possible sign relationships of the two items; a normally inoperative data magnitude comparing device adapted, when operative, to produce a unique output potential status for each of the three possible magnitude relationships, the said magnitude device including a plurality of bi-stable devices having a set and a reset condition and operative responsive to the applied magnitude significant signals to combinatorially change their status to manifest the relative magnitudes of the compared data items; means responsive to the potential statuses manifesting an equality of signs for rendering said data magnitude comparing device operative; means for establishing said bi-stable devices in their reset condition; means responsive to the potential status manifesting a negative sign status of both data items for reversing the stability status of said bi-stable devices; means responsive to the corresponding inequality potential statuses of the sign comparing means and of the magnitude comparing means for producing an inequality manifestation on a corresponding common output line; and means responsive to the equality manifesting potential status produced by said magnitude comparing device for producing an equality manifestation.

3. An apparatus for determining the relative absolute values of more than two data items, comprising data manifesting means adapted to produce data signals having both sign and magnitude significance for each of the data items whose relativity is to be determined; a plurality of comparing means, each operative responsive to applied data significant signals manifesting two data items to produce a predetermined potential status for each of the possible data relativity statuses; means so connecting the data manifesting means to the plurality of comparing means so as to apply data significant signals manifesting a different pair of data items to each of the comparing means; and means operative responsive to the data relativity status potentials, produced by said plurality of comparing means, for producing a unique output manifestive of the relativity of the absolute values of all said data items.

4. In a data evaluating device for manifesting the relative absolute values of more than two items of data; means manifesting the sign and magnitude of each separate one of said data items; a plurality of comparing devices each having input and output terminals, and each being adapted to compare the signs and magnitudes of two items of data and to produce on said output terminals a unique potential status manifestive of the relativity of the absolute values of the two items; means so connecting the input terminals of each of said comparing devices and said data item manifesting means so as to enter the respective sign and magnitude manifestations of each of unique pairs of data items; and means connected to the output terminals of said comparing devices, and operative responsive to the respective potential statuses thereof to produce a unique output signal manifestive of the relativity of the absolute values of all said items of data.

5. A data comparing device for manifesting the relative absolute values of more than two items of data comprising means manifesting the magnitude of each separate one of said data items; a plurality of comparing devices each having input and output terminals, and each being adapted to compare data significant input signals manifesting two items of data and to produce on said output terminals a unique potential status manifestive of the relativity of the values of the two items of data; means so connecting the input terminals of each of said data item manifesting means so as to enter the respective magnitude manifestation signals of each of unique pairs of data items; and means connected to the output terminals of said comparing devices, and operative responsive to the respective potential statuses thereof to produce a unique output signal manifestive of the relativity of the values of all said items of data.

References Cited in the file of this patent

UNITED STATES PATENTS

| | | |
|---|---|---|
| 2,511,996 | Robineau | June 20, 1950 |
| 2,555,774 | Wilson | June 5, 1951 |
| 2,580,768 | Hamilton et al. | Jan. 1, 1952 |
| 2,738,874 | Wilson et al. | Mar. 20, 1956 |
| 2,865,567 | Booth et al. | Dec. 23, 1958 |
| 2,884,616 | Fillebrown et al. | Apr. 28, 1959 |

UNITED STATES PATENT OFFICE

CERTIFICATE OF CORRECTION atent No. 3,023,399 February 27, 1962

Arthur H. Dickinson

It is hereby certified that error appears in the above numbered patent requiring correction and that the said Letters Patent should read as corrected below.

Column 4, line 51, for "gird" read -- grid --; column 10, ine 8, after "digit" insert -- in --; column 11, in the first able, column 2, line 4,and column 3, line 2 thereof, strike out he leaders, each occurrence, and insert instead a minus sign; olumns 11 and 12, Table 1, in the heading to column 3, line 3 hereof, for "-B" read -- -C --; column 12, line 55, after "Up" nsert -- at any time. For example, terminal 516 is Up --; olumn 13, line 40, for "-A>-B>-C>," read -- -A>-B>-C, --.

Signed and sealed this 11th day of September 1962.

SEAL)
test:

NEST W. SWIDER
testing Officer

DAVID L. LADD
Commissioner of Patents